US012226885B2

(12) United States Patent
Maier et al.

(10) Patent No.: US 12,226,885 B2
(45) Date of Patent: Feb. 18, 2025

(54) METHOD FOR DETERMINING A REMAINING SERVICE LIFE OF A HAND-HELD POWER TOOL AS WELL AS HAND-HELD POWER TOOL

(71) Applicant: Robert Bosch GmbH, Stuttgart (DE)

(72) Inventors: Sebastian Maier, Bietigheim-Bissingen (DE); Michael Briesenick, Ehningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/176,165

(22) Filed: Feb. 28, 2023

(65) Prior Publication Data

US 2023/0294263 A1 Sep. 21, 2023

(30) Foreign Application Priority Data

Mar. 18, 2022 (DE) ..................... 10 2022 202 681.0

(51) Int. Cl.
*B23B 45/02* (2006.01)
*B25B 21/00* (2006.01)
*B25F 5/00* (2006.01)

(52) U.S. Cl.
CPC .................................... *B25F 5/00* (2013.01)

(58) Field of Classification Search
CPC .................................. B25B 21/00; B25F 5/00
USPC .......................................................... 173/171
See application file for complete search history.

(56) References Cited

U.S. PATENT DOCUMENTS

| | | | | |
|---|---|---|---|---|
| 9,537,335 | B2 * | 1/2017 | Furui | H02J 7/00 |
| 10,562,116 | B2 * | 2/2020 | Dey, IV | B23D 59/001 |
| 2021/0240145 | A1 * | 8/2021 | Abbott | B25F 5/001 |
| 2022/0001526 | A1 * | 1/2022 | Wang | H02P 6/08 |

FOREIGN PATENT DOCUMENTS

| | | | |
|---|---|---|---|
| DE | 103 03 005 | A1 | 8/2004 |
| DE | 10 2015 211 584 | A1 | 12/2016 |
| DE | 10 2017 202 579 | A1 | 8/2018 |
| DE | 10 2019 128 902 | A1 | 4/2021 |
| WO | 2015/158598 | A1 | 10/2015 |

* cited by examiner

*Primary Examiner* — Thanh K Truong
*Assistant Examiner* — Patrick B Fry
(74) *Attorney, Agent, or Firm* — Maginot, Moore & Beck LLP

(57) ABSTRACT

A method for determining a remaining service life of a hand-held power tool includes, in an operating mode detection step, detecting an operating mode of the hand-held power tool by an alignment of operating data of the hand-held power tool with a comparative value table stored on the hand-held power tool and/or by a switch position detection function of an operating mode selection switch. In a computing step, the remaining service life of the hand-held power tool is calculated via at least the operating mode and its operating time and output to a user of the hand-held power tool in an outputting step.

16 Claims, 4 Drawing Sheets

METHOD FOR DETERMINING A REMAINING SERVICE LIFE OF A HAND-HELD POWER TOOL AS WELL AS HAND-HELD POWER TOOL

This application claims priority under 35 U.S.C. § 119 to application no. DE 10 2022 202 681.0, filed on Mar. 18, 2022 in Germany, the disclosure of which is incorporated herein by reference in its entirety.

BACKGROUND

A method is proposed for determining a remaining service life of a hand-held power tool, wherein, in an operating mode detection step, an operating mode of the hand-held power tool is detected by means of an alignment of operating data of the hand-held power tool with a comparative value table stored on the hand-held power tool and/or by means of a switch position detection function of an operating mode selection switch.

SUMMARY

The disclosure proceeds from a method for determining a remaining service life of a hand-held power tool, wherein, in an operating mode detection step, an operating mode of the hand-held power tool is detected by means of an alignment of operating data of the hand-held power tool with a comparative value table stored on the hand-held power tool and/or by means of a switch position detection function of an operating mode selection switch.

It is proposed that, in a computing step, the remaining service life of the hand-held power tool is calculated via at least the operating mode and its operating time and output to a user of the hand-held power tool in an outputting step.

In this context, a "hand-held power tool" is to be understood to mean, in particular, a portable machine that processes a workpiece, in particular a drilling machine and/or a drilling and/or slide hammer. Preferably, the term "hand-held power tool" contains various operating modes. The different operating modes are preferably provided in order to customize an operation of the hand-held power tool. The different operating modes preferably have at least different current strengths of an electric motor, different rotational speeds of a tool holder/electric motor, and/or different accelerations of the toolholder/electric motor of the hand-held power tool. The different operating modes are particularly designed in order to adapt the hand-held power tool to the needs of various applications, areas of use, and tool inserts. In particular, the hand-held power tool has at least operating modes for applications for idling, drilling, chiseling, and/or hammer-drilling. It is further conceivable that operating modes that appear to be reasonable for a person skilled in the art can be set on the hand-held power tool, for example for screwing, stirring, sawing, cutting, grinding, or the like. The hand-held power tool is in particular battery-powered. However, it is also conceivable that the method for determining the remaining service life of the hand-held power tool will be used on a wired hand-held power tool. Preferably, the hand-held power tool is configured so as to be switchable between different operating modes.

Preferably, in the operating mode detection step, the operating mode of the hand-held power tool is detected by means of alignment of the operating data of the hand-held power tool with a comparative value table stored on the hand-held power tool. Preferably, the comparative value table comprises at least four comparative value columns.

Each of the comparative value columns preferably has values for alignment with the operating data of the hand-held power tool. It is also conceivable, however, that in the operating mode detection step, the operating mode of the hand-held power tool is detected by means of the switch position detection function of the operating mode selection switch. In particular, the operating mode selection switch can be used in order to switch between the different operating modes. In one method step, the switch position detection function preferably transmits a signal to an evaluation unit of the hand-held power tool. Preferably, in one method step, the evaluation unit evaluates the operating mode of the hand-held power tool on the basis of the signal of the switch position detection function.

The remaining service life of the hand-held power tool is preferably dependent on the respective operating mode and its operating time. The remaining service life is preferably a result of wear on the mechanical, electronic, and mechatronic components of the hand-held power tool. Preferably, the wear varies depending on the operating mode. The wear is preferably calculated based on the operating mode or derived from empirical data compilation. In this context, an "operating time" is to be understood to mean in particular the time in which the hand-held power tool is operated in an operating mode. In one method step, the wear is preferably derived from the operating mode and its operating time. Preferably, in one method step, the remaining service life is calculated from the wear. Preferably, a service life of the hand-held power tool is sensed from the operating mode and its operating time. The service life preferably indicates how long the hand-held power tool has been in operation, in particular in all operating modes. In one method step, the service life is preferably output during the outputting step. Preferably, an upcoming service for the hand-held power tool is calculated from the service life. Preferably, during the outputting step, the remaining operating time for the respective operating mode until the next service is output. The service life is composed in particular of the individual operating times.

The remaining service life of the hand-held power tool can advantageously be precisely detected by the configuration of the method according to the disclosure for determining a remaining service life of a hand-held power tool. The remaining service life can be sensed with advantageously few additional electronics up to no additional electronics, without additional micro-controllers and/or sensors in a hand-held power tool. The remaining service life can advantageously be detected without any external resources for the evaluation.

Furthermore, it is proposed that the operating mode detection step, the computing step, and the outputting step are performed at each power-on of the hand-held power tool, wherein, in a storage step, the hand-held power tool stores all of the operating data, operating modes, and/or its operating times in a memory unit, in particular in a flash drive, of the hand-held power tool. In particular, an on/off switch of the hand-held power tool is operated, in particular pushed, in order to turn on the hand-held power tool. Preferably, in one method step, the on/off switch is actuated by a user of the hand-held power tool. The hand-held power tool is preferably switched on when the on/off switch is actuated by the user, in particular pushed. In one method step, the hand-held power tool runs in the preset operating mode when powered on. Preferably, the hand-held power tool shuts off upon disengagement of the on/off switch. It is conceivable that the on/off switch will control the speed and/or torque of the hand-held power tool as a function of the on/off switch position. In the computing step, preferably the remaining service life is recalculated after each power-on. In the outputting step, the current remaining service life is preferably displayed to the user after each power-on, in particular after each power-off. The memory unit is preferably arranged in a housing of the hand-held power tool. With the configuration of the method according to the disclosure, an advantageously reliable statement about the remaining service life of a hand-held power tool can be made as a function of an operation. Advantageously, any operation of the hand-held power tool can be assigned to an operating mode. A user of the hand-held power tool can be advantageously shown a current remaining service life after each operation.

Further, it is proposed that, in a data collection step, the operating data of the hand-held power tool is detected, in particular a switch position of an on/off switch and/or at least a current, acceleration, or speed value of the ongoing operation of the hand-held power tool. Preferably, the hand-held power tool comprises at least one sensor unit, which is provided for sensing at least a portion of the operating data. During the data collection step, the sensor unit preferably senses the current values during operation of the hand-held power tool. The current values of the hand-held power tool are preferably measured in terms of circuitry between the electric motor and a power source, in particular a battery, of the hand-held power tool. Preferably, the sensor unit senses the switch position of the on/off switch in the data collection step. In the data collection step, the sensor unit preferably senses the operating time in which the hand-held power tool is powered on. In this context, an "acceleration value" is to be understood in particular to mean the acceleration of the tool holder of the hand-held power tool or the acceleration of the electric motor. In particular, in the data collection step, the acceleration of the tool holder or the electric motor is sensed from turning on the hand-held power tool, in particular from a minimum speed, until a maximum speed is reached for the particular operating mode. In this context, a "speed value" is to be understood in particular to mean the speed of the tool holder of the hand-held power tool or the electric motor. It is also conceivable that the sensor unit and/or the evaluation unit can receive at least a portion of the operating data from a device control function of the hand-held power tool. With the configuration of the method according to the disclosure, an operating mode of a hand-held power tool can advantageously be determined precisely and in particular simply by means of a data collection function.

Furthermore, it is proposed that, in a verification step, the switch position of the on/off switch is verified. The verification step is in particular a sub-step of the operating mode detection step. Preferably, in the verification step, a time is recorded in which the on/off switch is in the actuated, in particular pushed, switch position. During the verification step, the sensed switch position and the time in the respective switch position are aligned with the comparative value table. The comparative value table preferably contains comparative data in a first of the at least four comparative value columns. In particular, the comparative data in the first comparative value column indicates how long the on/off switch must be in an actuated switch position for the operation to be assigned to an operating mode. Preferably, the comparative data of the first comparative value column indicates that the on/off switch must be operated least 0.3 seconds, preferably 0.4 seconds, and more preferably at least 0.5 seconds for the operating mode detection. In the verification step, it is verified in particular whether the on/off switch is operated long enough. Due to the configuration of the method, it can advantageously be reliably determined whether an operation of the hand-held power tool has taken long enough in order to determine an operating mode.

Further, it is proposed that, in a first classification step, an average and a slope of the current value are classified. The first classification step is, in particular, a sub-step of the operating mode detection step. The first classification step is preferably performed after the verification step. Preferably, a second of the at least four comparative value columns contains comparative data for the current values sensed in the data collection step. The comparative data of the current values are in particular divided into at least four average classes for averages and at least three slope classes for the slope of the current value. The slope and average when operating the hand-held power tool are preferably determined in the data collection step. In particular, during the data collection step, a moving average, a minimum, and a maximum of the current value are determined during the operation of the hand-held power tool. In particular, in the data collection step, the slope of the current value is determined upon reaching a certain threshold. The threshold is preferably 0.3 A, preferably 0.6 A, and more preferably 1 A. In the classification step, the determined average, in particular the moving average, and the slope of the current value are divided into the respective classes of the second comparative value column. Due to the configuration of the method according to the disclosure, current values can advantageously be easily and meaningfully divided into different classes in order to derive an operating mode therefrom.

Furthermore, it is proposed that, in a second classification step, an average and a slope of the acceleration value are classified. The second classification step is preferably performed after the verification step. The second classification step is, in particular, a sub-step of the operating mode detection step. Preferably, a third of the at least four comparative value columns contains comparative data for the acceleration values sensed in the data collection step. The comparative data of the acceleration values are in particular divided into at least four average classes for averages and at least three slope classes for the slope of the acceleration value. The slope and average of the acceleration value when operating the hand-held power tool are preferably determined in the data collection step. In particular, during the data collection step, a moving average, a minimum, and a maximum of the acceleration value are determined during the operation of the hand-held power tool. In particular, in the data collection step, the slope of 1*o* the acceleration value is determined upon reaching a certain threshold. The threshold is preferably 20 $m/s^2$, preferably 35 $m/s^2$, and more preferably 50 $m/s^2$. In the classification step, the determined average, in particular the moving average, and the slope of the acceleration value are divided into the respective classes of the third comparative value column. Due to the configuration of the method according to the disclosure, acceleration values can advantageously be easily and meaningfully divided into different classes in order to derive an operating mode therefrom.

Further, it is proposed that, in a third classification step, an average and a slope of the speed value are classified. The third classification step is preferably performed after the verification step. The third classification step is, in particular, a sub-step of the operating mode detection step. Preferably, a fourth of the at least four comparative value columns contains comparative data for the speed values arising from the data collection step. The comparative data of the speed value is in particular divided into at least three average classes for averages and at least two slope classes for the slope of the speed value. The slope and average of the speed value when operating the hand-held power tool are preferably determined in the data collection step. In particular, during the data collection step, a moving average, a minimum, and a maximum of the speed value are determined during the operation of the hand-held power tool. In particular, in the data collection step, the slope of the speed value is determined upon reaching a certain threshold. The threshold is preferably 5,000 rpm, preferably 10,000 rpm, and more preferably 18,000 rpm. In the classification step, the determined average, in particular the moving average, and the slope of the speed value are divided into the respective classes of the fourth comparative value column. In the operating mode detection step, preferably by means of dividing the current, acceleration, and speed values into a respective class, an operating mode of the hand-held power tool is derived. Preferably, in the operating mode detection step, in particular after the verification step and the three classification steps, an allocation is performed. In particular, the operating data is allocated into at least three average classes and at least three slope classes each time the hand-held power tool is operated. For each operating mode, the allocation preferably comprises at least one combination of the three average classes and three slope classes for clear detection of the operating mode. The combination preferably comprises a first composition of an average class and a slope class of the current values, a second composition of an average class and a slope class of the acceleration values, and a third composition of an average class and a slope class of the speed values. Preferably, the allocation for each operating mode comprises at least one combination having three respective combinations of average classes and slope classes. It is conceivable that operating modes can be assigned to multiple combinations. Due to the configuration of the method, an operating mode of a hand-held power tool can advantageously be derived by way of an advantageously simple allocation of operating data.

Furthermore, it is proposed that, in a collection step, in particular prior to the production of the hand-held power tool, and in particular during the development phase, the comparative value table is created by an operating mode measurement. Preferably, in the collection step, various measurements are taken in which current, acceleration, and speed values of the hand-held power tool are recorded in every possible operating mode. The values measured in the collection step are preferably stored on the memory unit, in particular the flash drive, of the hand-held power tool. Preferably, the values from the collection step are used in order to define the classes of the comparative value table. The comparative value table preferably comprises at least one combination of three average classes and three slope classes for every possible operating mode. Preferably, the combination for determining the operating mode is determined with an average class and a slope class from the second comparative value column, an average class and a slope class from the third comparative value column, and an average class and a slope class from the fourth comparative value column of the comparative value table. Due to the configuration of the method, the various classes of the comparative table can advantageously be used precisely, and in particular reliably, in order to determine an operating mode of the hand-held power tool.

Further, it is proposed that the comparative value table is updated in an updating step, in particular in a regular time interval. In particular, the regular time interval is a maximum of one year, preferably six months, preferably three months, and particularly preferably one month. Preferably, in the updating step, at least the values in the classes of the comparative value table are updated. Preferably, in the updating step, the classes for the classification steps are updated. In this context, when it is mentioned that the values of the comparative value table are updated, it should be understood to mean that the values of the comparative table are expanded with further values, that values are deleted from the comparative value table, and/or that values from the comparative value table are replaced with further values. In this context, when it is mentioned that the classes of the comparative value table are updated, it should be understood to mean value ranges defining the classes are changed, in particular made smaller or larger, that new classes are incorporated in the comparative value table, and/or that existing classes are removed from the comparative value table. Preferably, in the updating step, empirical values collected during operation of the hand-held power tool are used in order to update the comparative value table. Due to the configuration of the method, an advantageously precise and reliable operating mode detection of a hand-held power tool can be provided. Advantageously, current empirical comparative values can be used in order to update a comparative value table.

Furthermore, it is proposed that, in the outputting step feedback regarding at least the remaining service life, the operating modes, and its operating times is displayed to the user by means of a human-machine interface ("HMI") and/or transmitted wirelessly to a terminal device. The outputting step is preferably performed after the computing step. Preferably, the current operating mode is indicated to the user by means of an optical output device during the outputting step. The optical output device is preferably configured as an LED and/or as a display. Further optical output devices that appear to be reasonable to a person skilled in the art can also be used, which can identify different operating modes. The HMI is preferably arranged on the hand-held power tool. Preferably, the HMI is configured as a display, a touchscreen, or a comparable HMI that appears reasonable to a person skilled in the art, which is provided so as to indicate a remaining service life, an operating mode, and its operating time. In particular, the current operating mode is output to a user during the outputting step, in particular via the HMI, the optical output device, and/or the terminal device. During the outputting step, the current operating time in the current operating mode of the hand-held power tool is output, particularly by way of the HMI and/or terminal device. Preferably, during the wireless transmission, at least the data of the service life, the operating mode, and its operating time are transmitted to a terminal device via Bluetooth. Preferably, the hand-held power tool comprises a Bluetooth module for wireless data transmission. It is also conceivable that the data of the service life, the operating mode, and its operating time can be transmitted by means of another wireless type of connection that appears reasonable to a person skilled in the art, which is suitable for transmitting data from a hand-held power tool to a terminal device, for example by means of a Zigbee, Z-Wave, 6LoWPAN, NFC, WiFi Direct, GSM, LTE, NB-IoT, LTE-M, Z-Wave Long Range, Thread, HomeKit, DotDot, and/or a sidewalk connection. The terminal device is preferably configured as a smartphone, a laptop, a computer, and/or a tablet. The data of the service life, the operating mode and its operating time could also be transmitted to another terminal device, which appears to be reasonable to a person skilled in the art, which allows a user to display this data. Preferably, in the outputting step, the user is informed when a critical remaining service life is reached. The user is in particular informed via the HMI, the optical output device, and/or the terminal device upon reaching the critical remaining service life. Due to the configuration of the method, it is advantageous for a user to be informed of the remaining service life, the operating mode, and the time of operation of a hand-held power tool. A warning can advantageously be output when a critical remaining service life is reached.

Further, a hand-held power tool is proposed, having at least one electronic apparatus comprising at least a memory unit, an evaluation unit, and a sensor unit, and having at least an HMI for performing the method for determining a remaining service life according to the disclosure. The sensor unit is preferably provided at least to sense the operating data, in particular the switch position of the on/off switch and/or at least the current, acceleration, or speed values of the ongoing operation of the hand-held power tool, and the operating time. The sensor unit is preferably configured so as to provide the sensed operating data and the operating time of the evaluation unit. The sensor unit preferably comprises a current measuring device for measuring the current values. Preferably, the current measuring device is arranged in terms of circuitry so that the current values between the electric motor and the power source, in particular the battery, of the hand-held power tool, are measured. Preferably, the sensor unit comprises a switch position detection function, which senses the switch position of the operating mode selection switch by means of a sensor. The sensor unit preferably comprises a further sensor for sensing the switch position of the on/off switch. Preferably, the sensor unit comprises a time-of-flight sensor, which is provided in order to sense the operating time of the hand-held power tool. In particular, the time-of-flight sensor is provided in order to sense the time in which the on/off switch is actuated, in particular pushed. Preferably, the sensor unit comprises at least one speed sensor, which is provided for sensing the speed values of the hand-held power tool. In particular, the speed sensor is provided in order to sense the speed values of the tool holder of the hand-held power tool and/or the electric motor of the hand-held power tool. The speed sensor is preferably configured as a Hall effect sensor, an inductive sensor, an oscillating sensor, or another sensor that appears reasonable to a person skilled in the art, which is suitable for sensing the speed values of the hand-held power tool. Preferably, the sensor unit comprises at least one accelerometer for measuring the acceleration values of the hand-held power tool. Preferably, the evaluation unit is provided in order to align the operating data and the operating time, which are in particular sensed by the sensor unit, with the comparative value table. The evaluation unit is preferably provided for classifying the operating data by means of the table of comparative values. The evaluation unit is in particular configured so as to derive the operating mode of the hand-held power tool from the alignment of the operating data with the comparison table, in particular from the classification. Preferably, the evaluation unit is provided for calculating a remaining service life of the hand-held power tool, in particular by means of the operating mode and the operating time. Preferably, the evaluation unit is provided in order to transmit the calculated remaining service life, operating mode, and operating time to an outputting unit of the hand-held power tool. It is conceivable that the sensor unit forms part of the device control of the hand-held power tool. Preferably, the device control function is configured such that operating data, such as the switch position of the operating mode selection switch, the switch position of the on/off switch, the speed values, the current values, and/or the acceleration values of the hand-held power tool required in order to operate the hand-held power tool, are transmitted to the sensor unit and/or directly to the evaluation unit. In this context, a "device control" of the hand-held power tool is to be understood in particular as an electrical and/or electronic unit of the hand-held power tool that controls the hand-held power tool as a function of the switch position of the operating mode selection switch and/or the on/off switch. The outputting unit is preferably provided in order to transmit at least the calculated remaining service life, the operating mode and its operating time, and/or a signal to the terminal device when a critical remaining service life is reached using the HMI, using the optical output device, and/or wirelessly. Preferably, the outputting unit comprises the Bluetooth module for wirelessly transmitting data to the terminal device. However, it is also conceivable that the hand-held power tool can have a different type of connection for wirelessly transmitting data, for example, a Zigbee, Z-Wave, 6LoWPAN, NFC, WiFi Direct, GSM, LTE, NB-IoT, LTE-M, Z-Wave Long Range, Thread, HomeKit, Dot-Dot, and/or a sidewalk connection. The HMI is preferably configured as a display and/or as a touch screen. The optical output element is preferably configured as an LED and/or as a display. Due to the configuration of the hand-held power tool according to the disclosure, the remaining service life of the hand-held power tool can advantageously be calculated directly by the hand-held power tool and output to a user. Advantageously, the operating mode and time of operation can be displayed to a user.

The method according to the disclosure for determining a remaining service life of a hand-held power tool and the hand-held power tool according to the disclosure are not intended to be limited to the application and embodiment described above. In order to fulfill a functionality described herein, the method according to the disclosure for determining a remaining service life of a hand-held power tool and the hand-held power tool according to the disclosure can comprise in particular a number of individual elements, components, units, and method steps that deviates from a number mentioned herein. Moreover, for the ranges of values indicated in this disclosure, values lying within the mentioned limits are also intended to be considered disclosed and usable as desired.

BRIEF DESCRIPTION OF THE DRAWINGS

Further advantages will become apparent from the following description of the drawing. The drawing shows an embodiment example of the disclosure. The drawing, the description, and the claims contain numerous features in combination. The person skilled in the art will expediently also consider the features individually and combine them into reasonable further combinations.

The following are shown.

DETAILED DESCRIPTION

Figure 1:
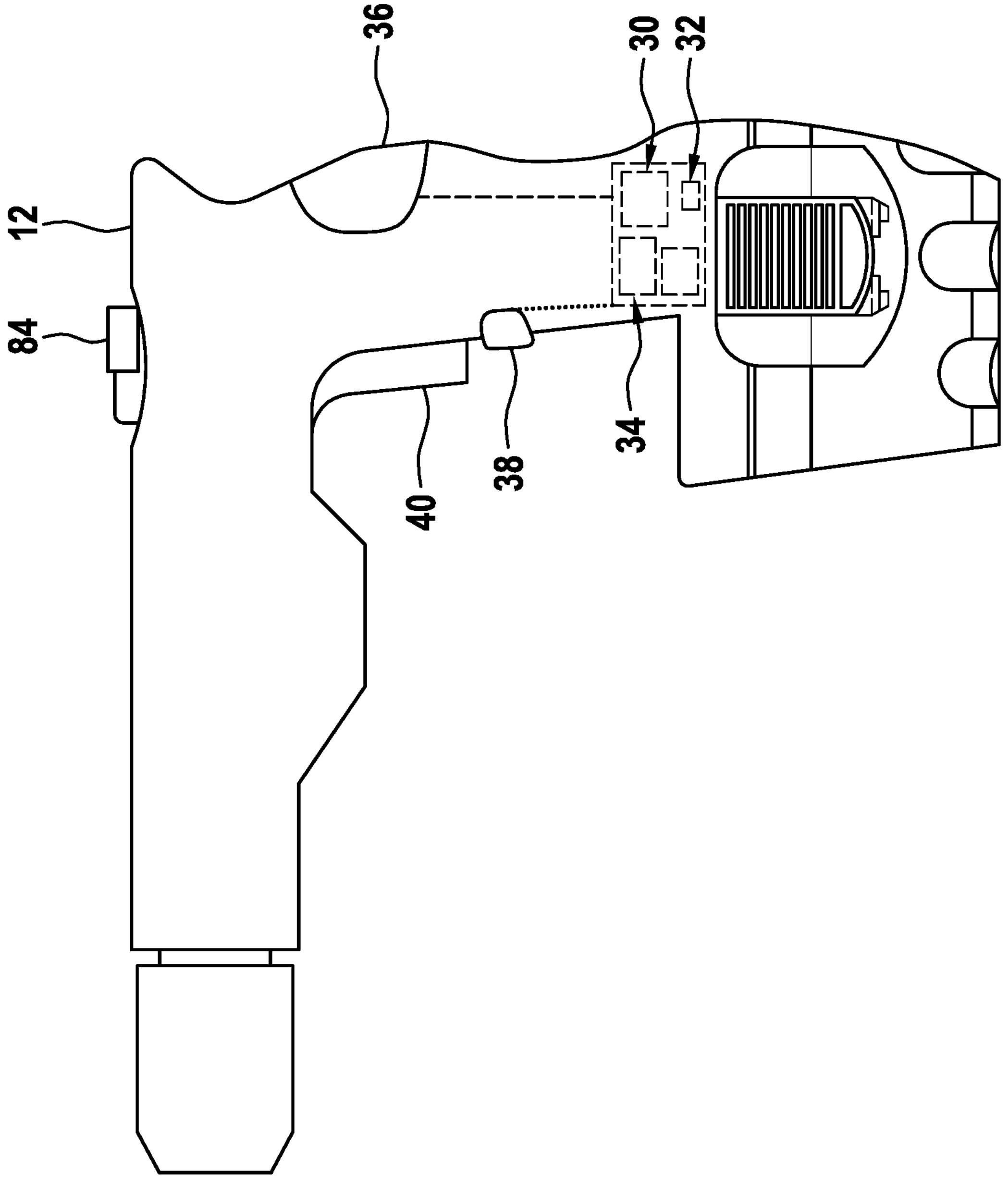
FIG. 1 a hand-held power tool according to the disclosure in a schematic representation, FIG. 2 a method according to the disclosure for calculating a remaining service life in a schematic representation, FIG. 3 the method according to the disclosure for calculating the remaining service life in a schematic representation.

FIG. 1 shows a hand-held power tool 12 having an electronic apparatus comprising a memory unit 30, an evaluation unit 32, and a sensor unit 34, and having an HMI 36. The hand-held power tool 12 is provided in order to perform a method 10 for determining a remaining service life 54. The sensor unit 34 is provided in order to sense operating data 58, in particular a switch position of an on/off switch 40 and/or current, acceleration, or speed values of the current operation of the hand-held power tool 12, and an operating time. The sensor unit 34 comprises a current measuring device for measuring the current values. The current measuring device is arranged in terms of circuitry so that the current values between an electric motor and a power source, in particular a battery, of the hand-held power tool 12, are measured. The sensor unit 34 comprises a switch position detection function, which senses a switch position of an operating mode selection switch 84 by means of a sensor. The sensor unit 34 comprises a further sensor for sensing the switch position of the on/off switch 40. The sensor unit 34 comprises a time-of-flight sensor, which is provided in order to sense the operating time of the hand-held power tool 12. The sensor unit 34 comprises a speed sensor, which is provided for sensing the speed values of the hand-held power tool 12. The sensor unit 34 comprises an accelerometer for measuring the acceleration values of the hand-held power tool 12. The evaluation unit 32 is provided in order to align the operating data 58 and the operating time, which are in particular sensed by the sensor unit 34, with a comparative value table 56. It is conceivable that the sensor unit 34 can be configured as part of the device control of the hand-held power tool 12. The device control function is configured such that operating data 58, such as the switch position of the operating mode selection switch 84, the switch position of the on/off switch 40, the speed values, the current values, and/or the acceleration values of the hand-held power tool 12 required in order to operate the hand-held power tool 12, are transmitted to the sensor unit 34 and/or directly to the evaluation unit 32. The outputting unit is provided in order to transmit the calculated remaining service life time 54, an operating mode 52, and its operating time, and/or a signal upon reaching a critical remaining service life 54 by means of an HMI 36, an optical output device 38, and/or wirelessly to terminal device 46. The outputting unit comprises a Bluetooth module for wirelessly transmitting data to the terminal device 46. The HMI 36 is configured as a touchscreen. The optical output device 38 is configured as an LED.

Figure 2:
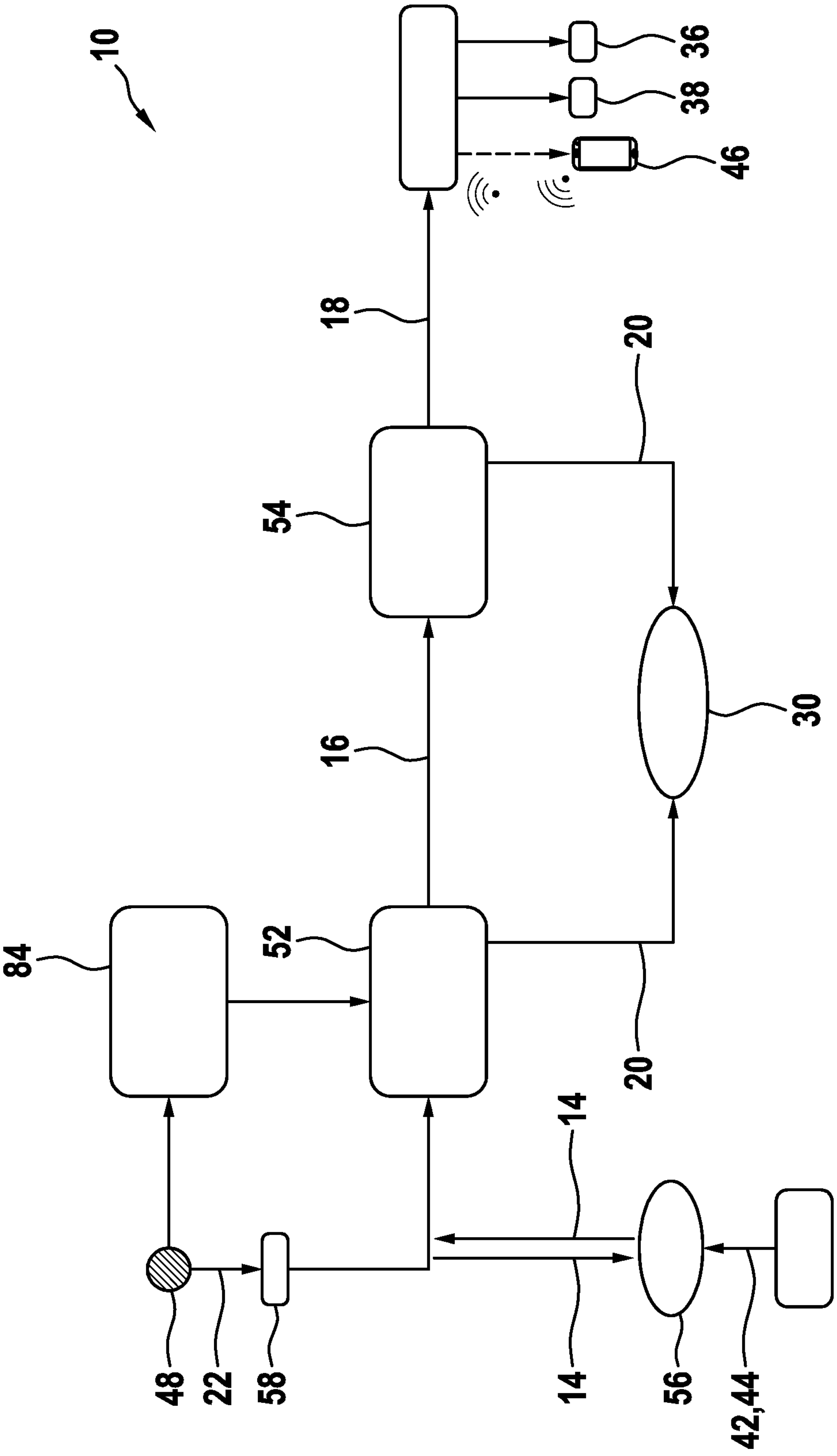

FIG. 2 shows a method 10 for determining the remaining service life time 54 of the hand-held power tool 12, wherein, in an operating mode detection step 14, the operating mode 52 of the hand-held power tool 12 is detected by an alignment of the operating data 58 of the hand-held power tool 12 with a comparative value table 56 stored on the hand-held power tool 12 and/or by a switch position detection function of the operating mode selection switch 84. In a computing step 16, the remaining service life 54 of the hand-held power tool 12 is calculated via at least the operating mode 52 and its operating time and output to a user of the hand-held power tool 12 in an outputting step 18. The hand-held power tool 12 has different operating modes 52. In the operating mode detection step 14, the operating mode 52 of the hand-held power tool 12 is detected by means of alignment of the operating data 58 of the hand-held power tool 12 with the comparative value table 56 stored on the hand-held power tool 12. The comparative value table 56 has four columns of comparative values. Each of the comparative value columns preferably has values for alignment with the operating data 58 of the hand-held power tool 12. It is also conceivable that, in the operating mode detection step 14, the operating mode 52 of the hand-held power tool 12 is detected by means of a switch position detection function of the operating mode selection switch 84. In one method step, the switch position detection function transmits a signal to the evaluation unit 32 of the hand-held power tool 12. In one method step, the evaluation unit 32 evaluates the operating mode 52 of the hand-held power tool 12 based on the signal of the switch position detection function. A service life of the hand-held power tool 12 is sensed from the operating mode 52 and its operating time. In the outputting step 18, the service life is output.

The operating mode detection step 14, the computing step 16, and the outputting step 18 are performed at each power-on 48 of the hand-held power tool 12. In a memory step 20, the hand-held power tool 12 stores all operating data 58, operating modes 52, and/or its operating times in the memory unit 30, in particular in a flash drive, of the hand-held power tool 12 (FIG. 2). For the power-on 48 of the hand-held power tool 12, the on/off switch 40 of the hand-held power tool 12 is operated, in particular pushed. In one method step, the on/off switch 40 is actuated by a user of the hand-held power tool 12. The hand-held power tool 12 is switched on when the on/off switch 40 is actuated by the user, in particular pushed. The hand-held power tool 12 shuts off upon disengagement of the on/off switch 40. In the computing step 16, the remaining service life time 54 is recalculated after each power-on 48. In the outputting step 18, the current remaining service life 54 is displayed to the user after each power-on 48, in particular after each power-off. In the storage step 20, the current remaining service life time 54 is stored in the memory unit 30.

In a data collection step 22, the operating data 58 of the hand-held power tool 12 is detected, in particular a switch position of the on/off switch 40 and/or at least a current, acceleration, or speed value of the ongoing operation of the hand-held power tool 12 (FIG. 2). The hand-held power tool 12 comprises the sensor unit 34, which is provided in order to sense at least a portion of the operating data 58. The sensor unit 34 senses the current values during operation of the hand-held power tool 12 during the data collection step 22. The current values of the hand-held power tool 12 are measured in terms of circuitry between the electric motor and a power source, in particular a battery, of the hand-held power tool 12. The sensor unit 34 senses the switch position of the on/off switch 40 in the data collection step 22. In the data collection step 22, the sensor unit 34 senses the operating time in which the hand-held power tool 12 is powered on.

Figure 3:
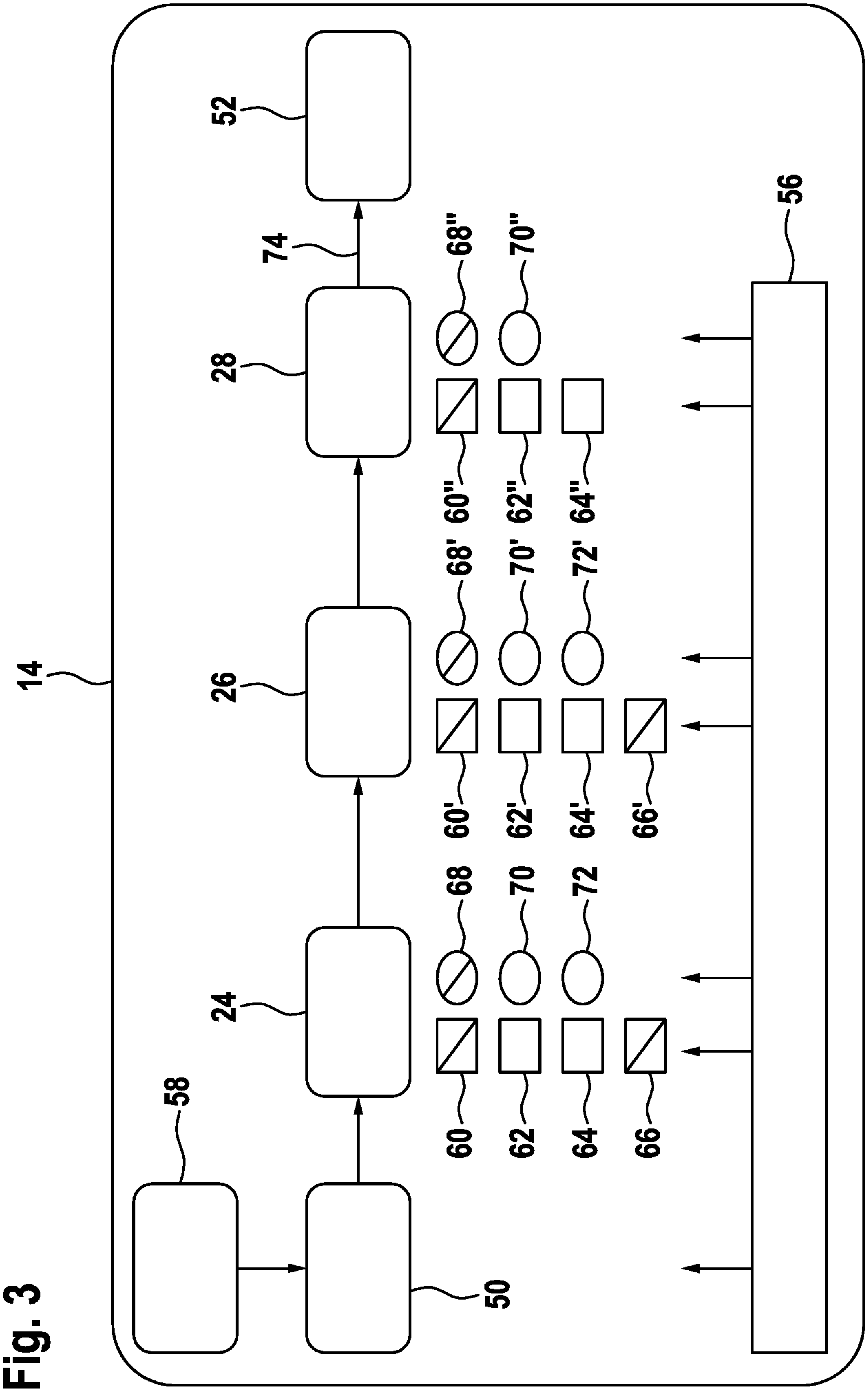

In a verification step 50, the switch position of the on/off switch 40 is verified (FIG. 3). The verification step 50 is a sub-step of the operating mode detection step 14. In the verification step 50, a time is sensed in which the on/off switch 40 is in the actuated, in particular pushed, switch position. During the verification step 50, the sensed switch position and the time in the particular switch position are aligned with the comparative value table 56. The comparative value table 56 contains comparative data in a first of the at least four comparative value columns. The comparative data of the first comparative value column indicates how long the on/off switch 40 must be in an actuated switch position for the operation to be assigned to an operation operating mode 52. The comparative data of the first comparative value column indicates that the on/off switch 40 must be operated least 0.3 seconds, preferably 0.4 seconds, and more preferably at least 0.5 seconds for the operating mode detection. In the verification step 50, it is verified whether the on/off switch 40 is operated long enough.

In a first classification step 24, an average and a slope of the current value are classified (FIG. 3). The first classification step 24 is a sub-step of the operating mode detection step 14. The first classification step 24 is performed after the verification step 50. A second of the at least four comparative value columns contains comparative data for the current values from the data collection step 22. The comparative data of the current values are divided into four average classes 60, 62, 64, 66 for averages and three slope classes 68, 70, 72 for the slope of the current value. The slope and average when operating the hand-held power tool 12 are determined in the data collection step 22. During the data collection step 22, a moving average, a minimum, and a maximum of the current value are determined during the operation of the hand-held power tool 12. The slope of the current value is determined in the data collection step 22 upon reaching a certain threshold. In the classification step 24, the determined average, in particular the moving average, and the slope of the current value are divided into the respective classes of the second comparative value column. The first average class 60 contains all averaged current values greater than 50 A. The second average class 62 contains all averaged current values between 12 A and 50 A. The third average class 64 contains all averaged current values between 1 A and 12 A. The fourth average class 66 contains all averaged current values less than 1 A. The first slope class 68 contains all slopes of the current values greater than 50 A. The second slope class 70 contains all slopes of the current values between 12 A and 50 A. The third slope class 72 contains all slopes of the current values between 1 A and 12 A.

In a second classification step 26, an average and a slope of the acceleration value are classified (FIG. 3). The second classification step 26 is performed after the verification step 50. The second classification step 26 is a sub-step of the operating mode detection step 14. A third of the at least four comparative value columns contains comparative data for the acceleration values from the data collection step 22. The comparative data of the acceleration values are divided into four average classes for averages and three slope classes for the slope of the acceleration value. The slope and average of the acceleration value when operating the hand-held power tool 12 are determined in the data collection step 22. During the data collection step 22, a moving average, a minimum, and a maximum of the acceleration value are determined during the operation of the hand-held power tool 12. In the data collection step 22, the slope of the acceleration value is determined upon reaching a certain threshold. In the second classification step 26, the determined average, in particular the moving average, and the slope of the acceleration value are divided into the respective classes of the third comparative value column. The first average class 60' of the acceleration values contains all averaged acceleration values greater than 200 $m/s^2$. The second average class 62' of the acceleration values contains all average acceleration values between 100 $m/s^2$ and 200 $m/s^2$. The third average class 64' of the acceleration values contains all averaged acceleration values between 50 $m/s^2$ and 100 $m/s^2$. The fourth average class 66' of the acceleration values contains all averaged acceleration values less than 50 $m/s^2$. The first slope class 68' of the acceleration values contains all slopes of the acceleration values greater than 200 $m/s^2$. The second slope class 70' of the acceleration values contains all slopes of the acceleration values between 50 $m/s^2$ and 200 $m/s^2$. The third slope class 72' of the acceleration values contains all slopes of the acceleration values between 0 $m/s^2$ and 50 $m/s^2$.

In a third classification step 28, an average and a slope of the speed value are classified. The third classification step 28 is performed after the verification step 50. The third classification step 28 is a sub-step of the operating mode detection step 14. A fourth of the at least four comparative value columns contains comparative data for the speed values from the data collection step 22. The comparative data of the speed value is divided into three average classes for averages and two slope classes for the slope of the speed value. The slope and average of the speed value during operation of the hand-held power tool 12 are determined in the data collection step 22. During the data collection step 22, a moving average, a minimum, and a maximum of the speed value are determined during the operation of the hand-held power tool 12. The slope of the speed value is determined in the data collection step 22 upon reaching a certain threshold. In the third classification step 28, the determined average, in particular the moving average, and the slope of the speed value are divided into the respective classes of the fourth comparative value column. In the operating mode detection step 14, an operating mode 52 of the hand-held power tool 12 is derived by dividing the current, acceleration, and speed values into a respective class. The first average class 60" of the speed values contains all average speed values greater than 20,000 rpm. The second average class 62" of the speed values contains all averaged speed values that range from 18,000 rpm to 20,000 rpm. The third average class 64" of the speed values contains all average speed values less than 18,000 rpm. The first slope class 68" of the speed values contains all slopes of the speed values between 500 rpm and 1,000 rpm. The second slope class 70" of the speed values contains all slopes of the speed values less than 500 rpm.

Figure 4:
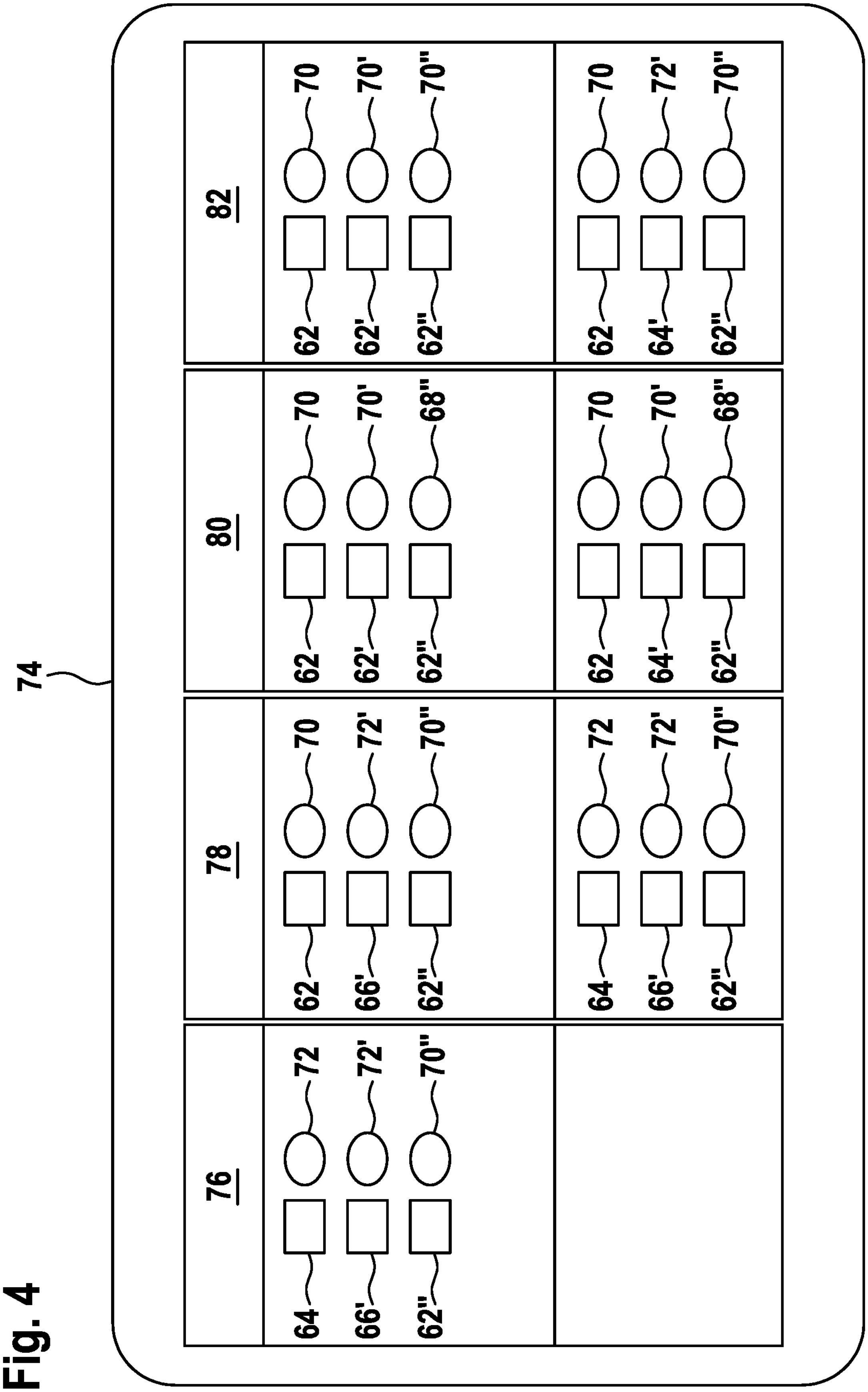
FIG. 4 is a schematic comparative value table with different classes in a schematic representation.

In a collection step 42, in particular prior to the production of the hand-held power tool 12, and in particular during the development phase, the comparative value table 56 is created by an operating mode measurement (FIG. 4). In the collection step 42, various measurements are taken in which current, acceleration, and speed values of the hand-held power tool 12 are recorded in every possible operating mode. The values measured in the collection step 42 are stored on the memory unit 30, in particular the flash drive, of the hand-held power tool 12. The values from the collection step 42 are used in order to define the classes of the comparative value table 56. The comparative value table 56 comprises at least one combination of three average classes and three slope classes for every possible operating mode 52. The combination for determining the operating mode 52 is determined with an average class and a slope class from the second comparative value column, an average class and a slope class from the third comparative value column, and an average class and a slope class from the fourth comparative value column of the comparative value table.

In an updating step 44, the comparative value table 56 is updated, in particular in a regular time interval (FIG. 2). The regular time interval is a maximum of one year, preferably six months, preferably three months, and particularly preferably one month. In the updating step 44, the values in the classes of the comparative value table 56 are updated. In the updating step 44, the classes for the classification steps 24, 26, 28 are updated. In the updating step 44, empirical values collected during operation of the hand-held power tool 12 are used in order to update the comparative value table 56.

In the outputting step 18, feedback regarding at least the remaining service life 54, the operating modes 52, and its operating times is displayed to the user by means of an HMI 36 and/or transmitted wirelessly to a terminal device 46 (FIG. 3). The outputting step 18 is performed after the computing step 16. The current operating mode 52 is displayed to the user in outputting step 18 by means of an optical output device 38. The optical output device 38 is configured as an LED. Further optical output devices 38 that appear to be reasonable to a person skilled in the art can also be used, which can identify different operating modes 52. The HMI 36 is arranged on the hand-held power tool 12. The HMI 36 is configured as a touchscreen, or a comparable HMI 36 that appears reasonable to a person skilled in the art, which is provided so as to indicate a remaining service life 54, an operating mode 52, and its operating time. The current operating mode 52 is output to a user during the outputting step 18, in particular via the HMI 36, the optical output device 38, and/or the terminal device 46. During the outputting step 18, the current operating time in the current operating mode 52 of the hand-held power tool 12 is output, particularly by way of the HMI 36 and/or the terminal device 46. During the wireless transmission, the data of the remaining service life 54, the operating mode 52, and its operating time are transmitted to a terminal device 46 via Bluetooth. The hand-held power tool 12 comprises a Bluetooth module for wireless data transmission. The terminal device 46 is configured as a smartphone, a laptop, a computer, and/or a tablet. In the outputting step 18, the user is informed when a critical remaining service life 54 is reached. The user is informed via the HMI 36, the optical outputting unit 38, and/or the terminal device 46 upon reaching the critical remaining service life 54.

In the operating mode detection step 14, in particular after the verification step 50 and the three classification steps 24, 26, 28, an allocation 74 is performed. The operating data 58 is allocated into at least three average classes and at least three slope classes each time the hand-held power tool is operated 12. For each operating mode 52, the allocation 74 comprises at least one combination of three average classes and three slope classes for clear detection of the operating mode 52. The combination comprises a first composition of an average class 60, 62, 64, 66 and a slope class 68, 70, 72 of the current values, a second composition of an average class 60', 62', 64', 66' and a slope class 68', 70', 72' of the acceleration values, and a third composition of an average class 60", 62", 64" and a slope class 68", 70". The allocation 74 for each operating mode 52 comprises at least one combination having three combinations of average classes and slope classes. The allocation 74 comprises combinations for sensing an idling 76, a drilling 78, a chiseling 80, and a hammer-drilling 82. The allocation 74 comprises two combinations each for the drilling 78, chiseling 80, and hammer-drilling 82, with three respective average classes and three respective slope classes. For example, FIG. 4 shows that a combination with a composition of the first average class 60 of the current values with the second slope class 70 of the current values, a combination of the fourth average class 66' of the acceleration values with the third slope class 72' of the acceleration values, and a combination of the second average class 62" of the speed values with a second slope class 70" of the speed values is allocated to the drilling 78. It is shown in FIG. 3 that certain average classes and certain slope classes do not lead to any allocation. The first and fourth average classes 60, 66 of the current values, the first slope class 68 of the current values, the first average class 60' and the first slope class 68' of the acceleration values, as well as the first and third average class 60" and 64" of the speed values do not result in an allocation 74 to any operating mode 52.

The invention claimed is:

1. A method for determining a remaining service life of a hand-held power tool, the method comprising:

detecting an operating mode, of a plurality of operating modes, of the hand-held power tool based on an alignment of operating data of the hand-held power tool with a comparative value table stored on the hand-held power tool;

calculating the remaining service life of the hand-held power tool via at least the detected operating mode and an operating time; and outputting the remaining service life to a user of the hand-held power tool, wherein the operating data includes electrical current values drawn by an electric motor of the hand-held power tool, acceleration values of the electric motor, and speed values of the electric motor during operation of the hand-held power tool, wherein, for each operating mode of the plurality of operating modes, the comparative value table includes three average classes and three slope classes, and wherein the operating data is allocated to at least one of the three average classes and three slope classes for each operating mode to detect the operating mode using the comparative value table.

2. The method according to claim 1, wherein:

the detecting of the operating mode, the calculating of the remaining service life, and the outputting of the remaining service life are performed at each power-on of the hand-held power tool;

the method further comprises storing all of the operating data, detected operating modes, and/or the operating times in a memory unit of the hand-held power tool.

3. The method according to claim 2, wherein the memory unit is a flash drive.

4. The method according to claim 1, further comprising: detecting the operating data of the hand-held power tool.

5. The method according to claim 4, wherein the detecting of the operating data further comprises detecting, as the operating data, a switch position of an on/off switch of the hand-held power tool.

6. The method according to claim 1, further comprising: verifying a switch position of an on/off switch of the hand-held power tool.

7. The method according to claim 1, further comprising: creating the comparative value table based on an operating mode measurement.

8. The method according to claim 7, wherein the creating of the comparative value table is performed prior to the production of the hand-held power tool and during a development phase.

9. The method according to claim 1, further comprising: updating the comparative value table at a regular time interval.

10. The method according to claim 1, wherein, the outputting of the remaining service life further comprises displaying feedback regarding at least the remaining service life, the operating modes, and the operating times to the user via at least one of a human-machine interface and wireless transmission to a terminal device.

11. The method according to claim 1, wherein:

a first average class and slope class is for the electrical current drawn by an electric motor of the hand-held power tool and includes a range of average electrical current and a range of slope of the electrical current, a second average class and slope class is for the acceleration of the electric motor and includes a range of average acceleration and a range of slope of the acceleration, and a third average class and slope class is for the speed values of the electric motor and includes a range of average speed values and a range of slope of the speed values.

12. The method according to claim 11, further comprising:

allocating the operating data into at least one of the three average classes and the three slope classes for each operating mode of the plurality of operating modes.

13. The method according to claim 12, wherein predetermined average classes and slope classes do not result in an allocation to an operating mode of the plurality of operating modes.

14. The method according to claim 1, wherein the plurality of operating modes includes an idling operating mode, a drilling operating mode, a chiseling operating mode, and a hammer drilling operating mode.

15. The method according to claim 1, further comprising:

collecting the operating data;

determining a moving average, a minimum, and a maximum of the electrical current values;

determining a slope of the electrical current values;

determining a moving average, a minimum, and a maximum of the acceleration values;

determining a slope of the acceleration values;

determining a moving average, a minimum, and a maximum of the speed values; and determining a slope of the speed values.

16. A hand-held power tool comprising:

an electric motor;

at least one electronic apparatus comprising:

a memory unit;

an evaluation unit; and a sensor unit configured to sense operating data including electrical current values drawn by the electric motor, acceleration values of the electric motor, and speed values of the electric motor during operation of the hand-held power tool; and a human-machine interface, wherein the at least one electronic apparatus is configured to:

detect an operating mode, of a plurality of operating modes, of the hand-held power tool based on an alignment of the operating data with a comparative value table stored on the hand-held power tool;

calculate the remaining service life of the hand-held power tool via at least the detected operating mode and an operating time; and output the remaining service life to a user of the hand-held power tool, wherein, for each operating mode of the plurality of operating modes, the comparative value table includes three average classes and three slope classes, and wherein the operating data is allocated to at least one of the three average classes and three slope classes for each operating mode to detect the operating mode using the comparative value table.

* * * * *